(12) United States Patent
Nakash

(10) Patent No.: US 9,686,182 B2
(45) Date of Patent: Jun. 20, 2017

(54) METHOD FOR IMPLEMENTING FAST RE-ROUTING (FRR)

(71) Applicant: ECI TELECOM LTD., Petach Tikva (IL)

(72) Inventor: Shell Nakash, Kfar Sava (IL)

(73) Assignee: ECI TELECOM LTD., Petah Tikva (IL)

( * ) Notice: Subject to any disclaimer, the term of this patent is extended or adjusted under 35 U.S.C. 154(b) by 73 days.

(21) Appl. No.: 14/607,349

(22) Filed: Jan. 28, 2015

(65) Prior Publication Data

US 2015/0215201 A1 Jul. 30, 2015

Related U.S. Application Data

(60) Provisional application No. 61/933,359, filed on Jan. 30, 2014.

(51) Int. Cl.
*H04L 12/28* (2006.01)
*H04L 12/703* (2013.01)
*H04L 12/707* (2013.01)
*H04L 12/723* (2013.01)

(52) U.S. Cl.
CPC ............. *H04L 45/28* (2013.01); *H04L 45/22* (2013.01); *H04L 45/50* (2013.01)

(58) Field of Classification Search
CPC .......... H04L 45/28; H04L 45/22; H04L 45/50
USPC ................................ 370/221–222, 242, 248
See application file for complete search history.

(56) References Cited

U.S. PATENT DOCUMENTS

| | | | |
|---|---|---|---|
| 2007/0174483 A1* | 7/2007 | Raj | H04L 12/18 709/238 |
| 2008/0170493 A1* | 7/2008 | Vasseur | H04L 45/00 370/217 |
| 2009/0292942 A1* | 11/2009 | Bhat | H04L 41/0668 714/4.1 |
| 2009/0292943 A1* | 11/2009 | Hanif | H04L 45/00 714/4.1 |

* cited by examiner

*Primary Examiner* — Farah Faroul
(74) *Attorney, Agent, or Firm* — Browdy and Neimark, PLLC (57) ABSTRACT

A method for providing a protected fast rerouting scheme for traffic conveyed in a network comprising a working path and a first backup path for conveying the traffic in case of a node failure. The method enables conveying traffic when two simultaneous failures occur, a failure of a link and/or of a node, belonging to the working path and the other—a failure occurring at a link and/or a node belonging to the first backup path. Upon detecting occurrence of a link/node failure along the working path, traffic is diverted to the first backup path, and upon detecting a concurrent failure at the downstream link/node at the first backup path, traffic is diverted to a second backup path extending from a node belonging to the first backup path and merges with the working path at a node located downstream of the failure that occurred at the working path.

9 Claims, 7 Drawing Sheets

METHOD FOR IMPLEMENTING FAST RE-ROUTING (FRR)

CROSS-REFERENCE TO RELATED APPLICATIONS

This application claims priority of U.S. Provisional Patent Application No. 61/933,359, filed Jan. 30, 2014, the disclosure of which is incorporated by reference herein in its entirety.

TECHNICAL FIELD

The present invention relates to the field of data networking, more specifically to protecting logical paths in packet-switched communication networks, and in particularly—to enable protection in cases of concurrent multiple failures occurring along MPLS point-to-multipoint label switched paths.

BACKGROUND

MPLS Technology

MPLS is a communication technology for forwarding packet-based traffic along pre-established logical paths called label switched paths (LSPs, a.k.a. tunnels), based on short labels associated therewith which allow identifying, classifying and forwarding data over LSPs. MPLS is designed to offer a reliable packet delivery, with predictable quality of service (QoS) guarantees, and supports traffic engineering (TE) to optimize usage of network resources.

An LSP is used for conveying traffic from a source (a.k.a., ingress, Head) node (a.k.a., label switching router, LSR) downstream to its destination (a.k.a., egress, Tail) LSR. The LSP may traverse intermediate (a.k.a., transit) LSRs. If there are no intermediate LSRs, the LSP is referred to as a single hop LSP.

Figure 1:
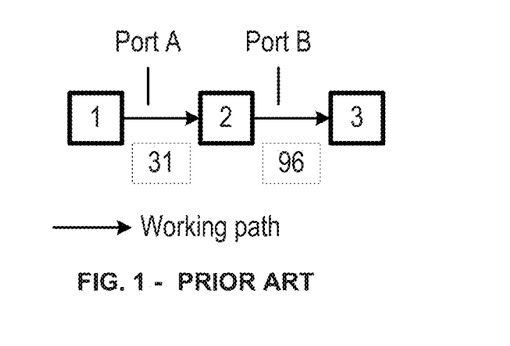
FIG. 1 illustrates a schematic prior art point- to point (P2P) Working path, which is an LSP in a case of an MPLS network.

FIG. 1 illustrates an LSP that originates at ingress LSR1, traverses through intermediate LSR2 (from port "A" to port "B") and extends to LSR3 where it is terminated. The LSP path may be summarized as 1-2-3.

Also illustrated in this Figure, is the MPLS label processing: ingress LSR1 pushes label 31 to an arriving packet as allocated by LSR2, while intermediate LSR2 swaps the label with another label, 96, as allocated by LSR3, so that the packet may be conveyed from LSR2 to LSR3.

Fast Reroute (FRR)

Fast reroute (FRR) is an MPLS resiliency mechanism for providing fast traffic restoration upon a link or a node failure, occurring along the LSP. With FRR, detours are pre-established along the LSP, thereafter an interrupted traffic stream may quickly be rerouted around a failed link or a failed node. This enables to complete recovery within a short period of time (under 50 milliseconds), thereby minimizing the adverse impact upon the traffic being conveyed at the time when the failure occurred. For the sake of simplicity, it shall be assumed hereinafter that upon failure of a link, both directions of that failing link are considered to be down. In other words, when the link illustrated in FIG. 1 in the direction that extends from LSR1 to LSR2, fails, that implies that the link in the direction that extends from LSR2 to LSR1 failed too.

In case of a failure, the LSR located upstream of the failure (a.k.a., point of local repair, PLR), redirects the traffic of the so-called working LSP onto a pre-established (P2P) backup LSP (a.k.a. bypass LSP), which conveys the traffic so that it is rerouted around the failure. The backup LSP brings the traffic from the PLR to an LSR located downstream of the failure (a.k.a., Merge Point, MP). Thereafter, the traffic resumes the original working LSP. The MP also serves as the egress LSR for the backup LSP.

For the sake of simplicity it will be assumed that the MP is the closest LSR located downstream of the failure. Accordingly, with FRR link protection, the MP is the next-hop (NH) LSR, i.e., it is the LSR located at the far end of the protected link. Similarly, with node protection, the MP is the next-next-hop (NNH) LSR, i.e. the LSR that follows the NH along the working LSP. For FRR link (node) protection to succeed, the backup LSP extending from the PLR to the NH (NNH) must not traverse the link extending between the PLR node and the NH node, nor should it reach the NH node itself.

In case of a penultimate hop PLR, the LSR located along the working path which precedes the egress LSR, can only perform link protection.

It will also be assumed herein that a failure of a protected link, would trigger a switchover to the backup LSP, irrespective of whether the cause for the failure is a link or a node failure. This procedure provides fast detection time, as it is based upon detecting physical layer defects, which can be detected very fast. Examples for such physical defects could be loss of signal, signal quality degradation, and remote failure indications.

Figure 2:
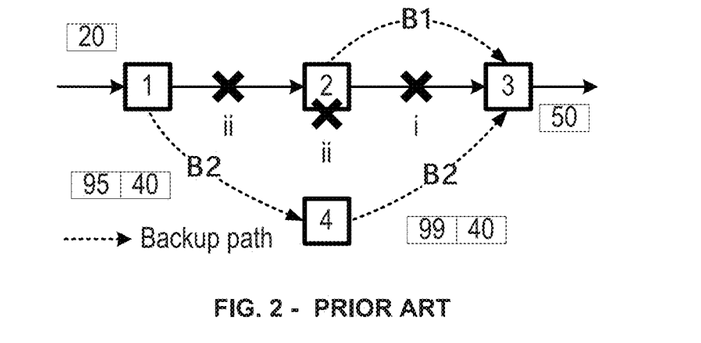
FIG. 2 illustrates a schematic prior art of implementing an FRR scheme.

FIG. 2 demonstrates an example where FRR is implemented for a Working LSP which includes three LSRs. A backup LSP, B1, enables protection against a failure of the link extending from LSR2 to LSR3. This backup LSP originates at PLR LSR2 and terminates at NH (relative to the PLR LSR2 location) LSR3. On the other hand, backup LSP B2 provides protection against a failure of LSR2, and consequently also against a failure of the link extending between LSR1 and LSR2. This backup LSP B2 originates at PLR LSR1, passes through intermediate LSR4, and terminates at NNH (relative to the PLR LSR1 location) LSR3.

The MPLS label processing which is also demonstrated in this FIG. 2 includes the following: LSR1 swaps Working label 20 with Working label 40 (as allocated by LSR3), and pushes backup label 95 towards LSR4 (as allocated by LSR4). LSR4 swaps the backup label 95 with label 99 and leaves the Working label 40 unchanged. LSR3 pops the backup label 99 and swaps the Working label 40 with label 50, as allocated by the subsequent hop.

Link Protection Scenario: when there is a failure at the link extending between LSR2 and LSR3, the PLR LSR2 redirects the traffic to B1, along which traffic would be conveyed to NH LSR3. Thereafter, the traffic resumes the original Working LSP.

Node Protection Scenario: when LSR2 fails, or there is a failure at the link extending between LSR1 and LSR2, the PLR LSR1 redirects the traffic to backup LSP B2, along which traffic would be conveyed to NNH LSR3. Thereafter, the traffic resumes the original Working LSP. As noted earlier, the failure of LSR2 is detected based on the failure occurring along the link connecting LSR1 and LSR2.

Multi-Failure Protection

The FRR scheme demonstrated above, enables protecting against a failure in the Working path. However, it does not address the problem of concurrent failures occurring along both the Working and the backup LSP. When considering a case of concurrent failures occurring in the setup demonstrated in FIG. 2, where failures occur both at the link of the Working LSP that extends between LSR1 and LSR2, and at the link of the backup LSP extending between LSR4 and LSR3, it is clear that in such a case, traffic cannot be recovered.

Figure 3:
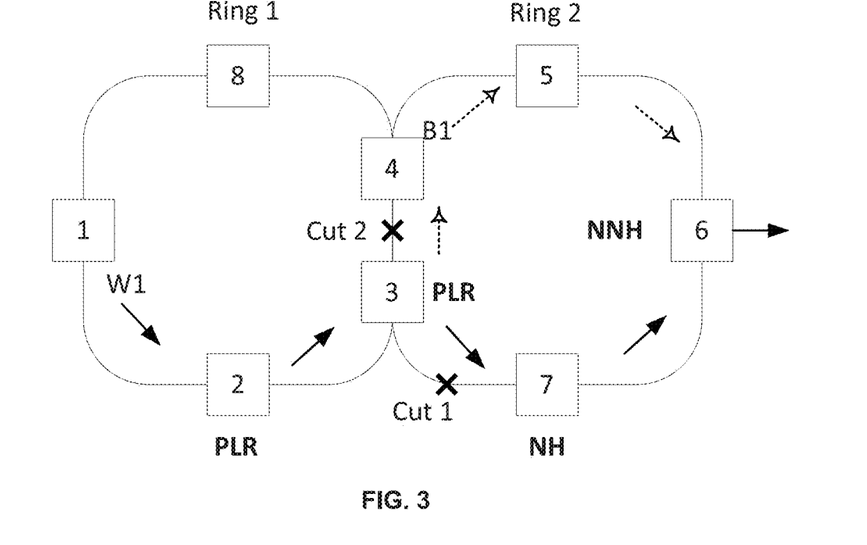
FIG. 3 illustrates the drawback of the prior art solution, being unable to address multi-failure protection in a network having a multi-ring topology.

FIG. 3 illustrates a multi-ring topology, where multi-failure protection could be required. A network depicted in this Fig. comprises two topological rings 1 and 2. Ring 1 is formed by LSRs 1-2-3-4-8, while ring 2 is formed by LSRs 3-4-5-6-7. The rings are interconnected via LSR3 and LSR4 (sometimes referred to as "ring gateways", or "gateways"), which share a common link 3-4. The links are typically realized by using optic fibers. A Working LSP W1 extends along LSRs 1-2-3-7-6 (marked with solid arrows) and is protected against the failure of NH LSR7 and the link 3-7 via the node protection backup LSP B1 that extends along LSRs 3-4-5-6 towards NNH LSR6 (marked with dashed arrows).

Node Protection Scenario: When the link 3-7 fails (Cut 1, marked with "x"), PLR LSR3 detects that link failure and assumes that NH LSR7 is down, and will therefore redirect the traffic to the backup LSP B1, which will convey the redirected traffic to NNH LSR6. The successfully recovered traffic continues over the Working LSP towards LSR6.

Dual Link Failure Scenario: When both links 3-7 and 3-4 fail, the behavior of PLR is the same as above, yet, since link 3-4 is down, the traffic cannot reach LSR4, and thus cannot be recovered.

IETF draft-vasseur-mpls-linknode-failure-00.txt (also described in US2003233595) uses a specific method for distinguishing between a link failure and a node failure at the PLR, and only after determining which of the two types of failures had occurred, it activates the appropriate type of protection. This requires signaling overhead over an alternate path, which does not include the directly connected link extending between the PLR and the NH, for detecting when the NH cannot be reached.

US 20110110224 discloses a dual FRR method, which provides both link and node protection, and uses backup LSP(s) in order to provide concurrent link and node protection (thus initiating a so-called Dual or concurrent FRR) while configuring a suitable blocking rule at the link protection merge point (the NH), to avoid traffic duplication that would otherwise occur with standard FRR. However, the main drawback of the disclosed method is the need to replicate traffic at the NNH (called NNHOP) which consumes extra (twice) resources at the NNHOP, where internal capacity resources are often limited. This is especially undesired when protecting a point to point ("P2P") Working path, where there is no reason to carry out packet replications.

US 20130094355 describes a method that enables carrying out a fast reroute protection technique which provides both link and node protection without traffic duplication, without the need to distinguish between link and node failures, and without replicating traffic. This method is based on a point-to-multipoint (P2MP) backup path, and a special non-standard rule applied at a very specific node (the "penultimate hop", PH) along that path, to reroute around a failure of the protection path. The main drawback of this method is that it is designed to recover only a specific failure of the protection path, namely the failure of the last hop of the P2MP backup path.

Figure 4:
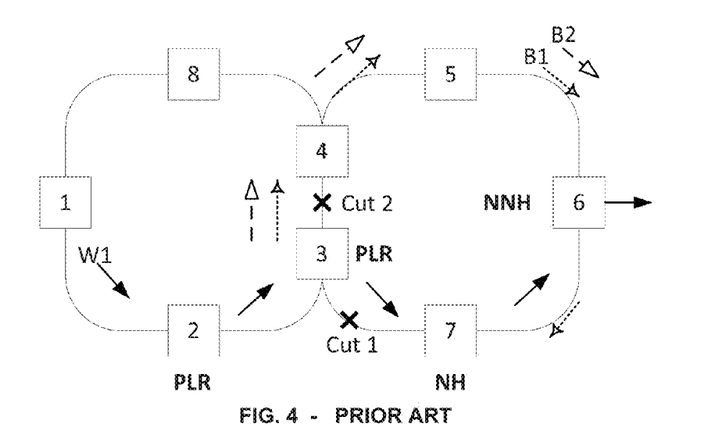
FIG. 4 demonstrates the drawback of the solution described by US 20130094355, being unable to address multi-failure protection at the network demonstrated in FIG. 3.

FIG. 4 illustrates the application of the solution suggested by the disclosure of US 20130094355A1 on the network demonstrated in FIG. 3. The working LSP W1 extends along 1-2-3-7-6. B1 (B2) is a P2MP sub-tunnel that extends along 3-4-5-6-7 towards NH LSR7 (NNH LSR6), respectively. The penultimate hop of B1 is actually the NNH, and is not an effective branching point to reroute the traffic from B1 to B2. For instance, when the link-3-7 fails ("Cut 1", marked with "x"), then PLR LSR3 would reroute the traffic towards NH LSR7. Yet, if link 3-4 is also down ("Cut 2", marked with "x"), the traffic conveyed along B1 fails to recover.

SUMMARY OF THE DISCLOSURE

It is an object of the present disclosure to provide a method for path provisioning and fast rerouting around concurrent failures of working and backup logical paths in communication networks.

It is another object of the present disclosure to provide a method to overcome concurrent failures of LSP logical paths.

Other objects of the invention will become apparent as the description of the invention proceeds.

According to a first embodiment of the present disclosure there is provided a method for providing a protected fast rerouting ("PFRR") scheme for traffic being conveyed in a communication network comprising a working path along which at least three nodes are located. These three nodes are a first node (which is the point of local repair, PLR), a second node (being the next hop, NH) and a third node (being the next-next-hop, NNH), where the numbering of these nodes is done with respect to a direction at which traffic is being conveyed along the working path towards its destination. The communication network further comprising a first backup path configured to enable conveying the traffic in case of a failure occurring at said second node, wherein the PFRR scheme is configured to enable conveying traffic towards its destination in case of at least two simultaneous failures occurring in the communication network, one being a failure of the second node or the link upstream of that second node and the other being a failure at a link or a node belonging to the first backup path, wherein the method comprises the steps of:

(a) upon detecting occurrence of a failure at the second node, diverting traffic that should have been conveyed along the working path to the second node, from the first node to the first backup path based on local link failure indications, towards the third node (being the next-next-hop located along the working path), and (b) upon detecting a concurrent failure at a link and/or node belonging to said first backup path, triggering a protection mechanism for diverting the traffic to a second backup path (being a shadow LSP) which extends from a node belonging to the first backup path and preceding the failing link or node, towards the second node of the working path (being the next hop located along the working path).

According to another embodiment, the first backup path comprises at least two parts, a first part that extends from the first node (being the PLR, the point of local repair) to a node that precedes the first node (being the FHOP, the former working hop, which in fact is the egress LSR of a single hop backup LSP) wherein the FHOP is located at a link being used to convey traffic to the first node along the working path, and a second part that extends from that FHOP towards a next-next-hop (NNH) located at the working path.

The PLR switchovers the traffic to the first backup path, based on detecting failure indications of its link extending towards the second node (next hop, NH), preferably by detecting physical layer defects thereat.

In a specific example wherein the PLR is a penultimate hop PLR (the LSR that precedes the egress LSR), a case wherein node protection is not possible, the backup path provides only link protection, i.e. it starts at that PLR and extends to the egress LSR (NH).

According to another embodiment, the second backup path is a pre-established detour (bypass) that extends from a node located at the first backup path upstream of the failed link or failed node, to the second node being the next hop (NH) located at the working path). Also, there could be multiple link protection backup paths, e.g. one for each failed link or node that is included in the first backup path. Along the first backup path, the LSRs (which are referred to sometimes throughout the specification as backup PLRs, BPLRs) would switchover the traffic to a second backup path that extends toward the second node (the NH of the working path), based on failure indications of the local links associated therewith.

The first backup path is configured to be merged with the working path at a third node, being a next-next-hop (NNH) with respect to the first node. The second backup path is configured to be merged with the working path at the second node, being a next hop (NH) along the working path. In other words, the shadow LSP is configured to be merged with the working LSP at the NNH of the working path when no failures occur along the first backup path, and at the NH of the working path when a failure occurs along the first backup path.

According to another embodiment, the method further comprises a step of forwarding traffic along the working path, wherein the traffic comprising packets provided with MPLS labels that were allocated by the label switching router (LSR) of the first backup path, and a step of forwarding traffic along the first backup path, wherein that traffic comprises packets provided with MPLS labels that were allocated by the LSR of the working path.

According to still another embodiment, the method further comprises a step of pre-provisioning the first backup path so that the communication network configuration that includes the pre-provisioned first backup path is in compliance with the following rules:

[1] it is possible to associate at least one second backup path with the first backup path, wherein each of the second backup paths extends from a node (BPLR) on the first backup path and terminates at the third node (NH) located along the working path. Thus, the second backup path should begin at the first backup path but should terminate at the NH belonging to the working path, rather than at a node that belongs to the first backup path. In other words, instead of conveying traffic to the first backup path at a node located downstream to the failure, traffic is conveyed along the second backup path directly to a node located along the working path; and

[2] that the associated at least one second backup path would not include a link which is comprised in the working path between the first node (i.e. the PLR) and the second node (NH). Consequently, instead of detouring only failures that occurred along the first backup path, the traffic conveyed along the second backup path also bypasses failures that occurred along the Working path. As a result of this solution, the second backup path is able to provide protection against failures occurring in an unrelated LSP, the working LSP.

It should be noted that if no failures have occurred along the first backup path, the traffic would be conveyed along that first backup path as it would be conveyed in an ordinary ("normal") FRR node protection scheme.

Also, where the first backup path has no hop associated with a second backup path according to the present invention (i.e., no failure along the node protection backup path can be recovered), the traffic would be conveyed along that first backup path as it would be conveyed in an ordinary ("normal") FRR node protection scheme.

According to yet another aspect there is provided a computer program product encoding a computer program stored on a non-transitory computer-readable medium for executing a set of instructions by one or more computer processors for launching a process described above and configured to be operated by the one or more computer processors.

The software product may be stored as part of a management system (e.g. at an EMS/NMS), but in the alternative it may be distributed between the EMS/NMS devices. In other words, the software product may be stored partially at a management system, and partially in a plurality of controlled network nodes comprised in the network which is being managed by that management system.

BRIEF DESCRIPTION OF THE DRAWINGS

For a more complete understanding of the present invention, reference is now made to the following detailed description taken in conjunction with the accompanying drawings wherein.

DETAILED DESCRIPTION

In the disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the present invention. It should be apparent, however, that the present invention may be practiced without these specific details.

Figure 5:
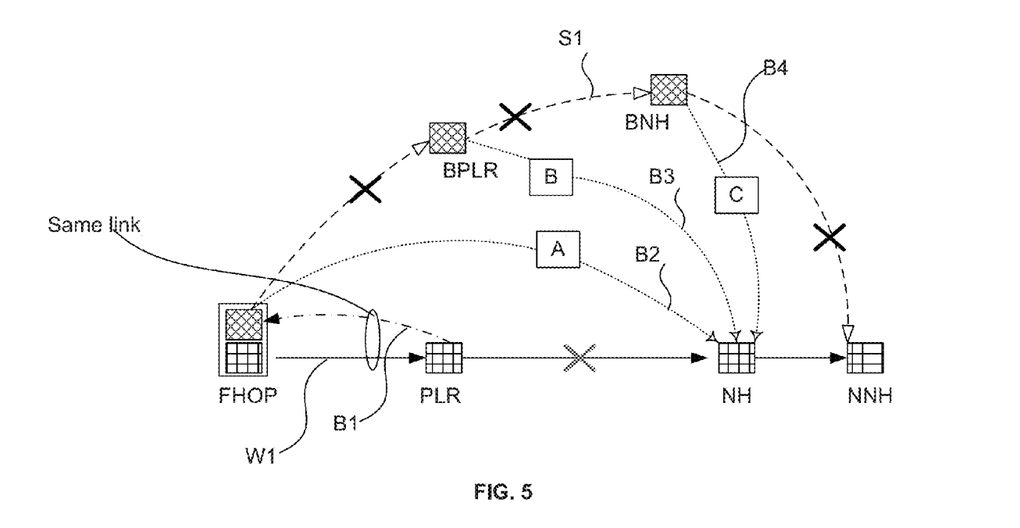
FIG. 5 illustrates schematically an embodiment of implementing the PFRR Scheme of the present invention.

FIG. 5 illustrates a PFRR scheme. A Working LSP W1 extends along FHOP-PLR-NH-NNH, and the PFRR mechanism is triggered by the PLR upon detecting the failure of the link extending from the PLR to the NH. The node protection backup path protects against the failure of NH, and is constructed from: (1) the single hop backup LSP B1 that extends from the PLR to the FHOP on the same link along which the PLR receives traffic being conveyed along the Working LSP W1; and (2) the Shadow LSP S1, that extends along FHOP-BPLR-BNH-NNH, and merges with the Working LSP W1 at the NNH.

The link protection backup LSP B2/B3/B4 protects against a failure of the link FHOP to BPLR/BPLR to BNH/BNH to NNH, and extends along FHOP-A-NH/BPLR-B-NH/BNH-C-NH, respectively towards the NH. All three link protection backup LSPs B2, B3, and B4 comply with the rules by which: [L1] Each of them begins at the first backup path and ends at the Working NH, rather than at a node that belongs to the first backup path; and [L2] each of them is characterized in that it does not comprise a link that extends from the (Working) PLR to the (Working) NH.

B2, B3, and B4 are examples for link protection backup paths, and such LSPs would be setup to recover any link or node failure along the node protection backup path, as long as the network topology enables such detours.

All the link protection backup paths, i.e. the second backup paths (including B2, B3, and B4) could be implemented as either separate point-to-point LSPs, or as a single multipoint-to-point (MP2P) LSP with multiple head LSRs (LSR1 for B2's path) and single Tail LSR (NH).

In the example illustrated in FIG. 5, the merging of the single hop backup LSP B1 with the Shadow LSP S1 relies on the use of MPLS labels: W1 merges with S1 at the FHOP, by forwarding the traffic with an MPLS label that was allocated by FHOP for S1. S1 merges with W1 at the NH (NNH), by forwarding the traffic with an MPLS label that was allocated by the NH (NNH), respectively.

Traffic would normally be conveyed along the Working LSP FHOP-PLR-NH-NNH. When the PLR detects a failure of the local link extending from the PLR to the NH (or the failure of NH itself, as the PLR is not required to distinguish between these two types of failures), it would reroute the traffic over B1 towards NNH, thereby achieving node protection. When there is a failure in the link FHOP-BPLR/BPLR to BNH/BNH to NNH in addition to the link PLR-NH, FHOP/BPLR/BNH respectively would switch the traffic of B1 towards B2/B3/B4, each being a second backup path that terminates at the NH, where traffic would be merged into the Working LSP, thus achieving a dual link failure protection.

However, there are certain drawbacks involved with the PFRR scheme, which should be taken into consideration:
(1) The node protection backup path might be not the most optimal backup path, e.g. it might be longer than it would have been had its passing through the FHOP not been enforced. However, this drawback may be tolerated, since this path is only used as backup, after the Working path has failed.
(2) At the Working Head node, there is no FHOP, therefore no protection is provided against a failure of the single hop backup LSP. However, this drawback is often eliminated.
(3) The node protection backup path might only be feasible if traffic is allowed to go from the PLR to the FHOP and then be "looped" back to PLR (i.e., if looping is forbidden policy, then no path would be found). While traffic could still recover, there would be an additional consumption of bandwidth reserved for protection. A possible workaround could be to re-compute the Working path, while excluding the looped PLR.

Figure 6:
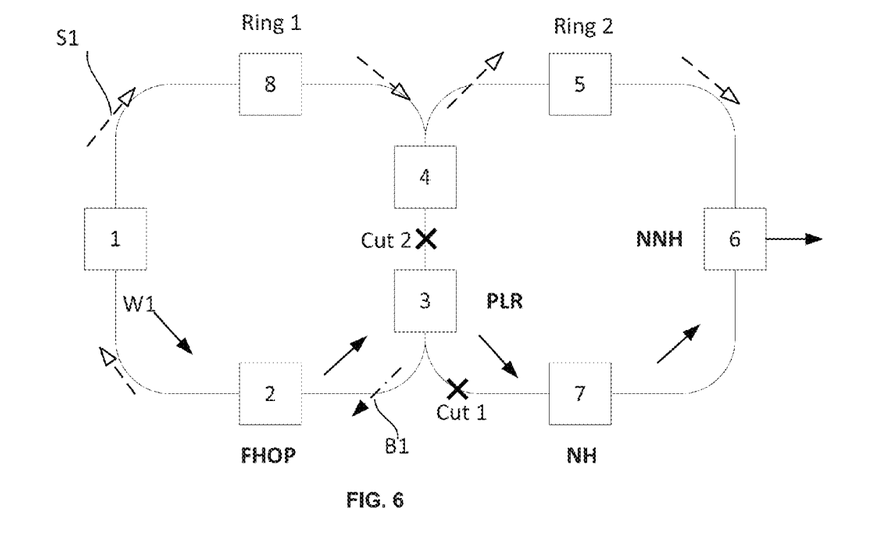
FIG. 6 illustrates an embodiment according to the present disclosure where the PFRR Scheme addresses multi-failure protection in a network having a multi-ring topology.

FIG. 6 illustrates a system that implements the PFRR scheme in the network illustrated in FIG. 3. A Working LSP W1 extends along 1-2-3-7-6, and the PFRR scheme is triggered by the PLR LSR3 upon occurrence of a failure of the link extending from PLR LSR3 to NH LSR7. The node protection backup path (the first backup path) protects against a failure of the NH LSR7, and is constructed from (1) the single hop backup LSP B1 that extends from PLR LSR3 to FHOP LSR2 which is the same link along which the PLR receives the traffic being conveyed along Working LSP W1; and (2) the Shadow LSP S1, that extends along 2-1-8-4-5-6-7, and merges with the Working LSP W1 at the NNH, LSR6.

Figure 7:
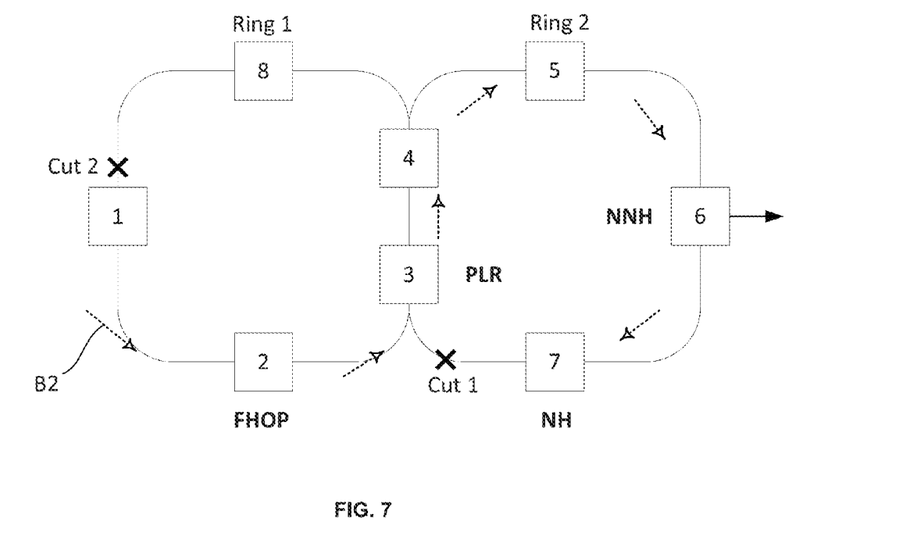
FIG. 7 illustrates a schematic example of the Link Protecting Backup LSP that is used to address the multi-failure protection for the network of FIG. 6.

FIG. 7 illustrates the link protection backup LSP, B2, for the example presented in FIG. 6, wherein normally, traffic would be conveyed along the Working path 1-2-3-7-6.

B2 protects against a failure of the link 1-8 (and failure of LSR8 itself), and extends along 1-2-3-4-5-6-7 towards the NH LSR7. LSP B2 complies with the first rule L1, since it starts at the node protection backup path (along the Shadow LSP S1) but ends at (Working) NH LSR7; and complies with the rule L2, since it does not traverse the link extending from PLR LSR3 to the NH LSR7.

It should be noted that B2 is one of the possible link protection backup LSPs. Other failures along the node protection backup LSP B1 could also be recovered. For example, the failure of 2-1 (8-4) could be recovered by a link protection backup LSP that extends along 2-3-4-5-6-7 (8-1-2-3-4-5-6-7) towards the NH LSR7. However, a failure of the link 4-5 cannot be recovered, because it would disconnect PLR LSR3, and traffic from PLR LSR3 would not be able to reach LSR7 or LSR6.

Node Protection Scenario: When the link 3-7 fails (Cut 1, marked with "+"), PLR LSR3 implies that NH LSR7 is down, and traffic is redirected to the backup LSP B1, along which it is conveyed to FHOP LSR2, where it is merged with the Shadow LSP S1. The merged path then extends to NNH LSR6, where it merges with the Working LSP W1. The successfully recovered traffic is then being conveyed over the Working LSP.

Dual Link Failure Scenario 1: When both links 3-4 and 3-7 fail, but LSR7 is up, the functioning of PLR LSR3 would be the same as described above, and the traffic will be conveyed along the backup LSP B1, and then along the Shadow LSP S1. Since B1 and S1 do not traverse the failed link 3-4, that link has no effect, and traffic would be conveyed over them to NNH LSR6, where it would merge with the Working LSP W1.

Dual Link Failure Scenario 2: When both links 1-8 and 3-7 fail but LSR7 stays up, the behavior of PLR LSR3 is the same as above, and the traffic flows along the backup LSP B1, and then along the Shadow LSP S1. If the link 1-8 is down, LSR1 would redirect the traffic to the backup LSP B2, along which it would be conveyed to NH LSR7. The successfully recovered traffic would then be forwarded over the Working LSP.

Figure 8:
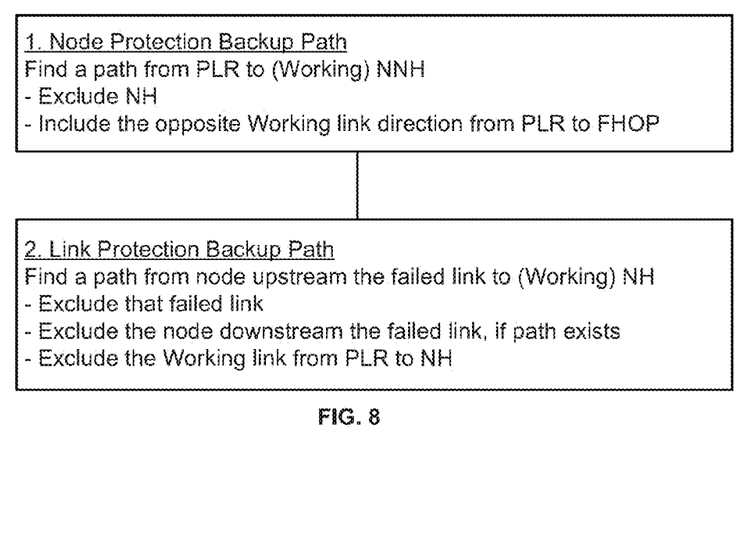
FIG. 8 presents a flow chart for implementing the PFRR mechanism.

FIG. 8 illustrates a flow chart for implementing the PFRR mechanism. Block 1 in this FIG. relates to the activities associated with finding a node protection backup path, i.e. a path that detours around a link or node failure along the Working path, as will be further explained. The path should start at the Working PLR and should end at the Working NNH. It should not traverse the NH (and obviously none of its links), as the purpose is to provide protection against a failure occurring at the NH. The path should extend to the FHOP (previous hop, shown also in FIG. 5), i.e. to the node along the Working path that precedes the PLR, via the opposite direction of the link along which the Working path arrives at the PLR.

Block 2 of this FIG. relates to finding a link protection backup path, i.e. a path that bypasses a link or a node failure that occurred along the node protection backup path, as will be further explained. The path should start at the node located upstream to the failed link, and should end at the Working NH. It should not traverse the failed link (since this link is down), and preferably (if a detour exists) should not traverse also the node located downstream to that failed link. Finally, it should not pass through the link that extends from the PLR to the NH, since that link is assumed to be down and is actually the root cause for having to convey that traffic over the link protection backup path.

Figure 9:
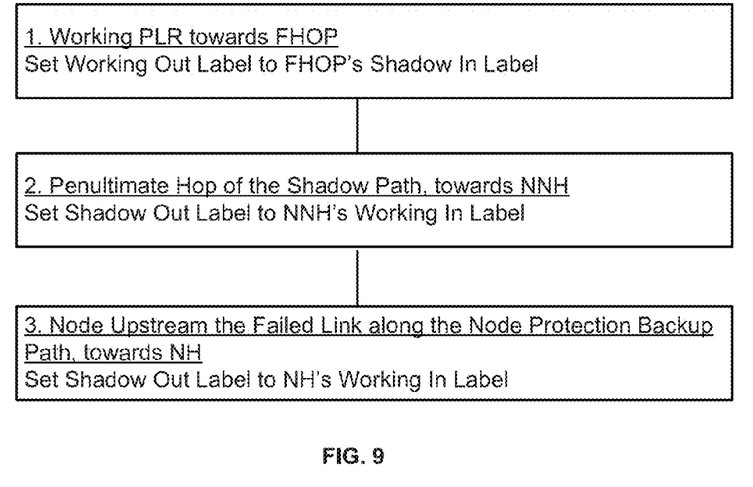
FIG. 9 presents an embodiment of the present disclosure for applying label merging rules while implementing the PFRR scheme.

FIG. 9 illustrates an embodiment of the present disclosure for applying label merging rules while implementing the PFRR scheme:

As presented in Block 1 of FIG. 9, the PLR should set the outgoing MPLS label of the Working LSP to that of the incoming MPLS label of the Shadow LSP at the FHOP. Thus, when the PLR switchovers the Working traffic to the single hop backup LSP, it should set an outgoing label that would be interpreted by FHOP as belonging to the Shadow LSP, so that the traffic may be conveyed along the Shadow LSP.

In Block 2, the penultimate hop of the Shadow LSP, which is the node located upstream to Working NNH, should set the outgoing MPLS label of the Shadow LSP to that of the incoming MPLS label of the Working LSP at NNH. Thus, when the NNH receives the traffic conveyed along the Shadow LSP, it would interpret it as belonging to the Working LSP, and would then forward the traffic along the Working LSP.

Next, in Block 3, the node upstream of the failed link (or failed node, as there is no need to distinguish there-between) which is located at the node protection backup path, should set the outgoing MPLS label of the Shadow LSP to the incoming MPLS label of the Working LSP at the NH. Thus, when it switchovers the Shadow traffic to the link protection backup LSP, it should set an outgoing label that would be interpreted by the NH as belonging to the Working LSP, which would in turn allow forwarding that traffic along the Working LSP.

FIGS. 10A to 10I present various problems that can be overcome by implementing the appropriate embodiments provided by the present disclosure.

Figure 10A:
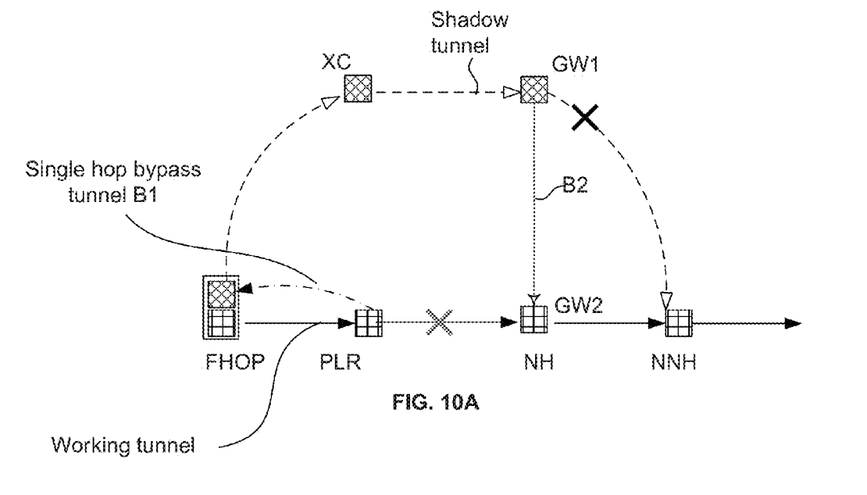
FIGS. 10A to 10H present various problems that can be overcome by implementing the appropriate embodiments provided by the present disclosure.

FIG. 10A illustrates a scenario wherein the working tunnel passes through one gateway. If there is a cut in the working path, backup path B1 is merged with the Shadow tunnel at the FHOP (being the previous hop of the working tunnel), and the traffic is conveyed along the Shadow tunnel to the NNH. If there is also a cut at the Shadow path, backup path B2 is merged with the working tunnel at the NH.

Figure 10B:
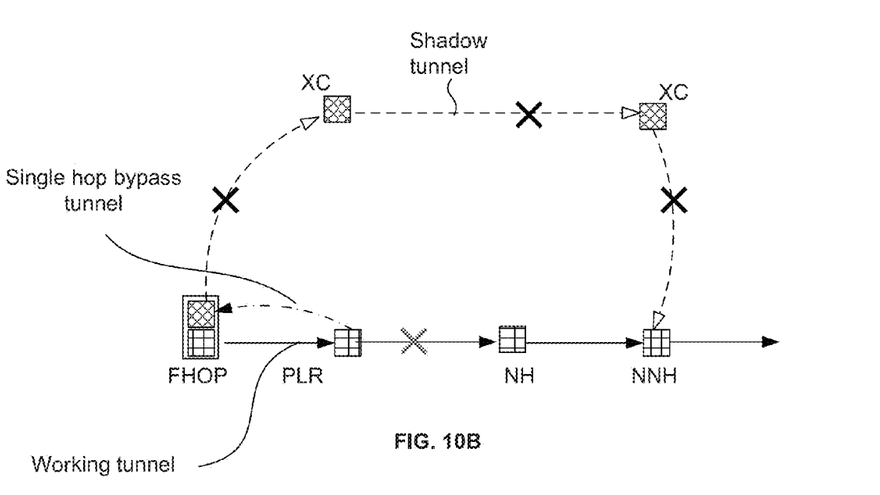

FIG. 10B illustrates a scenario wherein the working tunnel extends along a ring. In this case there is no need to implement the PFRR mechanism, since no cut in the Shadow path is recoverable.

Figure 10C:
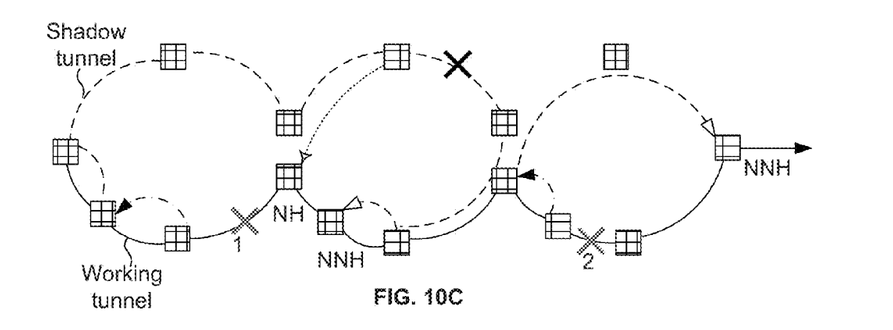

FIG. 10C illustrates a scenario of a multi-ring configuration, with one cut per each ring. In the case, in order to recover from a cut in the working path, the shadow tunnel is used to convey traffic to the NNH, and in order to recover from a cut in the shadow path, a bypass tunnel is used to convey the traffic to the NH.

Figure 10D:
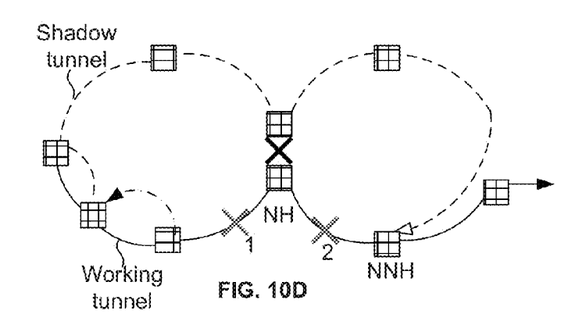

FIG. 10D presents a scenario in which the cut occurs at the shared part (the gateway). When the cut is at the working path, the shadow tunnel is used to forward traffic to the NNH. All other cuts have no effect on this scenario.

Figure 10E:
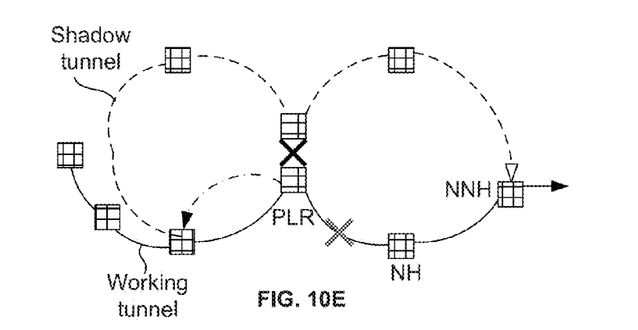

FIG. 10E presents a scenario of two cuts that occurred at the shared part (the gateway). When the cut is at the working path, the shadow tunnel is used to forward traffic to the NNH. The inter-gateway cut has no effect on this scenario.

Figure 10F:
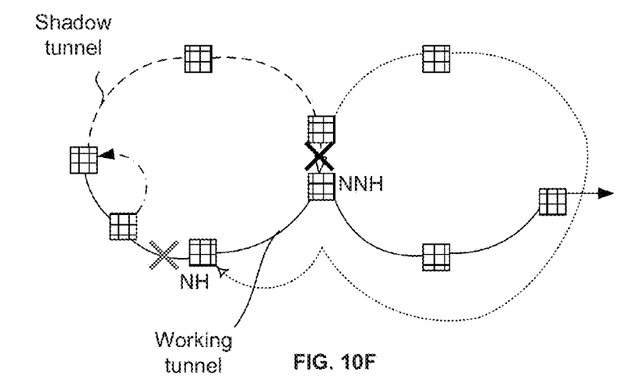

FIG. 10F illustrates a scenario of two cuts, of which one is at the gateway. If the cut is at the working path, the Shadow tunnel is used to convey the traffic to the NNH. If there is a cut along the Shadow path, the bypass tunnel will be used to convey the traffic to the NH.

Figure 10G:
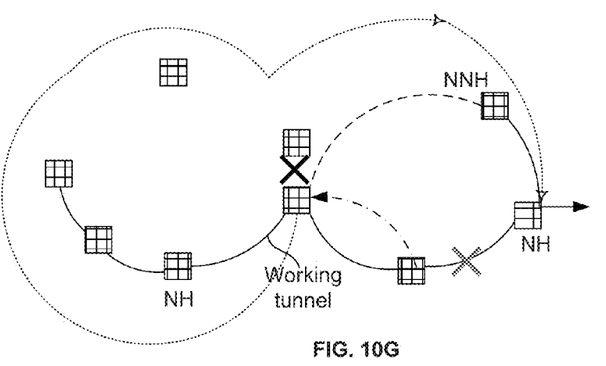

FIG. 10G illustrates a scenario of two cuts, of which one is at the gateway. If the cut is at the working path, the Shadow tunnel is used to convey the traffic to the NNH. If there is a cut along the Shadow path, the bypass tunnel will be used to convey the traffic to the NH.

Figure 10H:
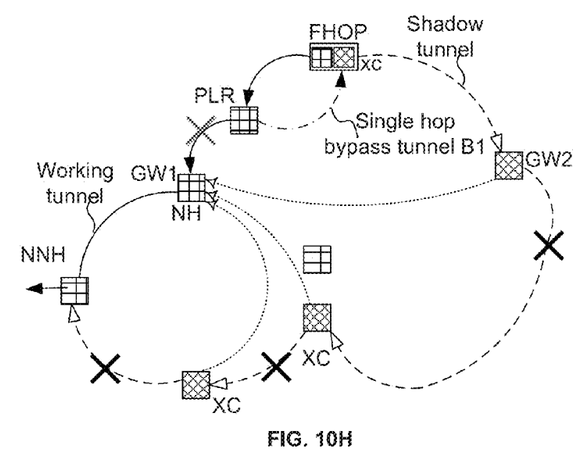

FIG. 10H illustrates a scenario wherein a spoke site is connected via two rings. In such a scenario, if there is a cut at the working path, the shadow tunnel is used to convey the traffic to the NNH. If there is a cut at the shadow path, the backup (bypass) tunnel is used for conveying the traffic to the NH.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for providing a protected fast rerouting ("PFRR") scheme, the method comprising:

providing a communication network comprising: 1) a working path along which at least three nodes, being a first node, a second node and a third node, are located, 2) a first backup path along which at least three nodes, being said first node, a fourth node, and said third node, are located, and 3) a second backup path along which at least two nodes, being said fourth node and said second node are located, wherein said first backup path is configured to enable conveying said traffic in case of a failure occurring at said second node, and wherein said second backup path is configured to enable conveying said traffic in case of a failure at occurring along said first backup path at a link located downstream of said fourth node, upon detecting occurrence of a failure at said second node, diverting traffic that should have been conveyed along said working path to said second node, from the first node to said first backup path, said diversion is made based upon local link failure indications, towards the third node being the next-next-hop located along the working path, and upon detecting a concurrent failure at link located downstream of said fourth node, diverting traffic that should have been conveyed along said first backup path to said third node, from the fourth node to a second backup path towards said second node of the working path and wherein said diversion is made based upon local link failure indications, enabling conveyance of traffic towards its destination in case of at least two concurrent failures in the communication network.

2. The method of claim 1, wherein said first backup path comprises at least two parts, a first part that extends from the first node to a node (FHOP) that precedes said first node and which is located along a link being used to convey traffic to the first node, and a second part that extends from said preceding node towards a next-next-hop (NNH) located at the working path.

3. A method of claim 2, wherein the two parts of said first backup path are configured to merge with the first backup path at a node that precedes the first node along the working path, being the former working hop (FHOP).

4. The method of claim 1, wherein the second backup path is at least one pre-established bypass that extends from a node located at the first backup path, upstream of a failed link or failed node, to the second node being a next hop located at the working path.

5. The method of claim 1, wherein said communication network comprises a plurality of second backup paths.

6. The method of claim 1, wherein said first backup path is configured to merge with the working path, at the third node, being a next next-next-hop (NNH) with respect to the first node, and when there is a failure that occurred along said first backup path, said second backup path is configured to merge with the working path at the second node, being a next hop (NH) along the working path.

7. The method of claim 1, further comprising a step of forwarding traffic along said working path, said traffic comprising packets provided with Multiprotocol Label Switching (MPLS) labels that were allocated by the label switching router (LSR) of the first backup path, and forwarding traffic along said first and second backup paths, said traffic comprising packets provided with MPLS labels that were allocated by the LSR of the working path.

8. The method of claim 1, further comprising a step of pre-provisioning the first backup path in compliance with the following rules:

[1] it is possible to associate at least one second backup path with the first backup path, wherein each of the second backup paths extends from the first backup path and terminates at the third node (NH) located along the working path; and

[2] that the associated at least one second backup path does not include a link which is comprised in said working path between the point of local repair (PLR) and the second node (NH).

9. A computer program product encoding a computer program stored on a non-transitory computer-readable medium for executing a set of instructions by one or more computer processors for launching a protected fast rerouting process in a communication network comprising: 1) a working path along which at least three nodes, being a first node, a second node and a third node, are located, 2) a first backup path along which at least three nodes, being said first node, a fourth node, and said third node, are located, and 3) a second backup path along which at least two nodes, being said fourth node and said second node are located, wherein said first backup path is configured to enable conveying said traffic in case of a failure occurring at said second node, wherein said second backup path is configured to enable conveying said traffic in case of a failure at occurring along said first backup path at a link located downstream of said fourth node, and wherein the process is configured to be operated by the one or more computer processors, and includes:

upon detecting occurrence of a failure at said second node, diverting traffic that should have been conveyed along said working path to said second node, from the first node to said first backup path, said diversion is made based upon local link failure indications, towards the third node being the next-next-hop located along the working path, and upon detecting a concurrent failure at link located downstream of said fourth node, diverting traffic that should have been conveyed along said first backup path to said third node, from the fourth node to a second backup path towards said second node of the working path and wherein said diversion is made based upon local link failure indications, enabling conveyance of traffic towards its destination in case of at least two concurrent failures in the communication network.

\* \* \* \* \*